(12) United States Patent
Spallaccini

(10) Patent No.: US 12,185,141 B2
(45) Date of Patent: Dec. 31, 2024

(54) METHOD AND SYSTEM FOR GENERATING SPATIAL DATA MAPS CORRESPONDING TO CENTRALIZED WIRELESS NETWORKS

(71) Applicant: HCL America Inc., Sunnyvale, CA (US)

(72) Inventor: Paolo Spallaccini, Vimodrone (IT)

(73) Assignee: HCL America Inc.

( * ) Notice: Subject to any disclaimer, the term of this patent is extended or adjusted under 35 U.S.C. 154(b) by 374 days.

(21) Appl. No.: 17/833,948

(22) Filed: Jun. 7, 2022

(65) Prior Publication Data

US 2023/0396507 A1 Dec. 7, 2023

(51) Int. Cl.
*H04W 24/08* (2009.01)
*H04L 41/14* (2022.01)
*H04W 40/24* (2009.01)

(52) U.S. Cl.
CPC ........... *H04W 24/08* (2013.01); *H04L 41/145* (2013.01); *H04W 40/246* (2013.01); *H04W 40/248* (2013.01)

(58) Field of Classification Search
CPC ...... H04W 24/08; H04W 4/029; H04L 41/145
See application file for complete search history.

(56) References Cited

U.S. PATENT DOCUMENTS 7,117,161 B2   10/2006  Bruce
10,784,974 B2   9/2020  Menon
10,885,239 B2   1/2021  Bak et al.
2011/0141136 A1   6/2011  Cardno et al.
2011/0250903 A1*  10/2011  Huang .................. H04W 24/00
                                                                          455/456.1

(Continued)

FOREIGN PATENT DOCUMENTS

CN       106714336 B       2/2020
JP         6916114 B2       8/2021
WO   WO-2018098123 A1 *   5/2018  ............... G03F 7/70

OTHER PUBLICATIONS

Konak, Abdullah. (2011). Estimating path loss in wireless local area networks using ordinary kriging. (2888-2896. 10.1109/WSC.2010.5678983.

(Continued)

*Primary Examiner* — Kevin C. Harper
(74) *Attorney, Agent, or Firm* — Kendal M. Sheets

(57) ABSTRACT

This disclosure relates to method and system for generating spatial data maps corresponding to a centralized wireless network. The method includes receiving in real-time, network data from each of a plurality of data sources through one or more user space applications; computing in convenient time frame, derived information based on the network data and geographical location of data source; iteratively evaluating the derived information for each of plurality of data points in network data span with missing information through kriging interpolation technique to obtain continuous derived information; for each of data point with missing information in previous iterations, comparing the derived information of current iteration step with the derived information at previous iteration steps to obtain trust score; and generating spatial data map based on geographical location of each of the plurality of data sources and at least one of the continuous derived information and the trust score.

20 Claims, 10 Drawing Sheets

(56) References Cited

U.S. PATENT DOCUMENTS

| | | | |
|---|---|---|---|
| 2012/0182144 A1* | 7/2012 | Richardson | G01S 5/02526 340/539.13 |
| 2018/0242178 A1* | 8/2018 | Barton | H04W 24/08 |
| 2020/0090088 A1 | 3/2020 | Arora et al. | |

OTHER PUBLICATIONS

Konak, Abdullah. (2009). A kriging approach to predicting coverage in wireless networks. International Journal of Mobile Network Design and Innovation. 3. 65-71. 10.1504/IJMNDI.2009.030838.

H. Zhao, B. Huang and B. Jia, "Applying kriging interpolation for WiFi fingerprinting based indoor positioning systems," 2016 IEEE Wireless Communications and Networking Conference, 2016, pp. 1-6, doi: 10.1109/WCNC.2016.7565018.

Umer, M., Kulik, L. & Tanin, E. Spatial interpolation in wireless sensor networks: localized algorithms for variogram modeling and Kriging. Geoinformatica 14, 101 (2010). https://doi.org/10.1007/s10707-009-0078-3.

* cited by examiner

METHOD AND SYSTEM FOR GENERATING SPATIAL DATA MAPS CORRESPONDING TO CENTRALIZED WIRELESS NETWORKS

TECHNICAL FIELD

This disclosure relates generally to wireless communication networks, and more particularly to generating spatial data maps corresponding to a centralized wireless network.

BACKGROUND

Developing accurate knowledge about various type of information pertaining to the dynamics of a physical layer in wireless transmission is a rather typical problem in communications theory, often solved by means of appropriate behavioral models. In the present state of art, alternatives to a model-based approach exist. In particular, when there is a an interest in gaining joint knowledge over information pertaining to the wireless transmission and in dynamically evolving impairments or constraints affecting the transmission, the alternatives to model-based approach become technically predominant.

Furthermore, the model-based approach fails to obtain some information knowledge over a specific geographical span, (like for instance, the mapping of given transmission (or service quality) indicators for networked transceivers over that span in which some of the possible transmission impairments are not known a priori). In such situations, specific techniques for spatial approximation can offer a solution.

However, conventional spatial approximation techniques lack in organizing the spatially dependent information (or indicator) in the form of a map with some method for observing, calculating, or inferring the spatially dependent information for a given and required space granularity. There is, therefore, a need in the present state of art for techniques to generate spatial data maps that provide insights on various indicators of a network.

SUMMARY

In one embodiment, a method for generating spatial data maps corresponding to a centralized wireless network is disclosed. In one example, the method includes receiving in real-time, by a central controller in the wireless network, network data from each of a plurality of data sources through one or more user space applications. The network data includes a plurality of Key Performance Indicators (KPIs) and raw information. The plurality of data sources includes a plurality of access points and one or more clients associated with each of the plurality of access points. The one or more user space applications are configured to establish a communication loop between each of the plurality of access points and the central controller. For each data source of the plurality of data sources, the method further includes computing in a convenient time frame, including real-time, by the central controller, derived information based on the corresponding network data and a geographical location of the data source. The method further includes iteratively evaluating, by the central controller, the derived information for each of the plurality of data points in network data span with missing information through a kriging interpolation technique at each of a plurality of iteration steps to obtain continuous derived information. For each of the plurality of data points with missing information in previous iterations, the method further includes comparing, by the central controller, at each of the plurality of iteration steps, the derived information of current iteration step with the derived information at previous iteration steps to obtain a trust score corresponding to the continuous derived information. The method further includes generating, by the central controller, a spatial data map based on the geographical location of each of the plurality of data sources and at least one of the continuous derived information and the trust score corresponding to each of the plurality of data sources.

In one embodiment, a system for generating spatial data maps corresponding to a centralized wireless network is disclosed. In one example, the system includes a processor and a computer-readable medium communicatively coupled to the processor. The computer-readable medium store processor-executable instructions, which, on execution, cause the processor to receive in real-time network data from each of a plurality of data sources through one or more user space applications. The network data includes a plurality of Key Performance Indicators (KPIs) and raw information. The plurality of data sources includes a plurality of access points and one or more clients associated with each of the plurality of access points. The one or more user space applications are configured to establish a communication loop between each of the plurality of access points and the central controller. For each data source of the plurality of data sources, the processor-executable instructions, on execution, further cause the processor to compute in a convenient time frame, including real-time, derived information based on the corresponding network data and a geographical location of the data source. The processor-executable instructions, on execution, further cause the processor to iteratively evaluate the derived information for each of the plurality of data points in network data span with missing information through a kriging interpolation technique at each of a plurality of iteration steps to obtain continuous derived information. For each of the plurality of data points with missing information in previous iterations, the processor-executable instructions, on execution, further cause the processor to compare at each of the plurality of iteration steps, the derived information of current iteration step with the derived information at previous iteration steps to obtain a trust score corresponding to the continuous derived information. The processor-executable instructions, on execution, further cause the processor to generate a spatial data map based on the geographical location of each of the plurality of data sources and at least one of the continuous derived information and the trust score corresponding to each of the plurality of data sources.

In one embodiment, a non-transitory computer-readable medium storing computer-executable instruction for generating spatial data maps corresponding to a centralized wireless network is disclosed. In one example, the stored instructions, when executed by a processor, may cause the processor to perform operations including receiving in real-time network data from each of a plurality of data sources through one or more user space applications. The network data includes a plurality of Key Performance Indicators (KPIs) and raw information. The plurality of data sources includes a plurality of access points and one or more clients associated with each of the plurality of access points. The one or more user space applications are configured to establish a communication loop between each of the plurality of access points and the central controller. For each data source of the plurality of data sources, the operations further include computing in a convenient time frame, including real-time, derived information based on the corresponding network data and a geographical location of the data source.

The operations further include iteratively evaluating the derived information for each of the plurality of data points in network data span with missing information through a kriging interpolation technique at each of a plurality of iteration steps to obtain continuous derived information. For each of the plurality of data points with missing information in previous iterations, the operations further include comparing at each of the plurality of iteration steps, the derived information of current iteration step with the derived information at previous iteration steps to obtain a trust score corresponding to the continuous derived information. The operations further include generating a spatial data map based on the geographical location of each of the plurality of data sources and at least one of the continuous derived information and the trust score corresponding to each of the plurality of data sources.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Further, the phrases "in some embodiments," "in accordance with some embodiments," "in the embodiments shown," "in other embodiments," and the like generally mean a particular feature, structure, or characteristic following the phrase is included in at least one embodiment of the present disclosure and may be included in more than one embodiment. In addition, such phrases do not necessarily refer to the same embodiments or different embodiments. It is intended that the following detailed description be considered as exemplary only, with the true scope and spirit being indicated by the following claims.

Figure 1:
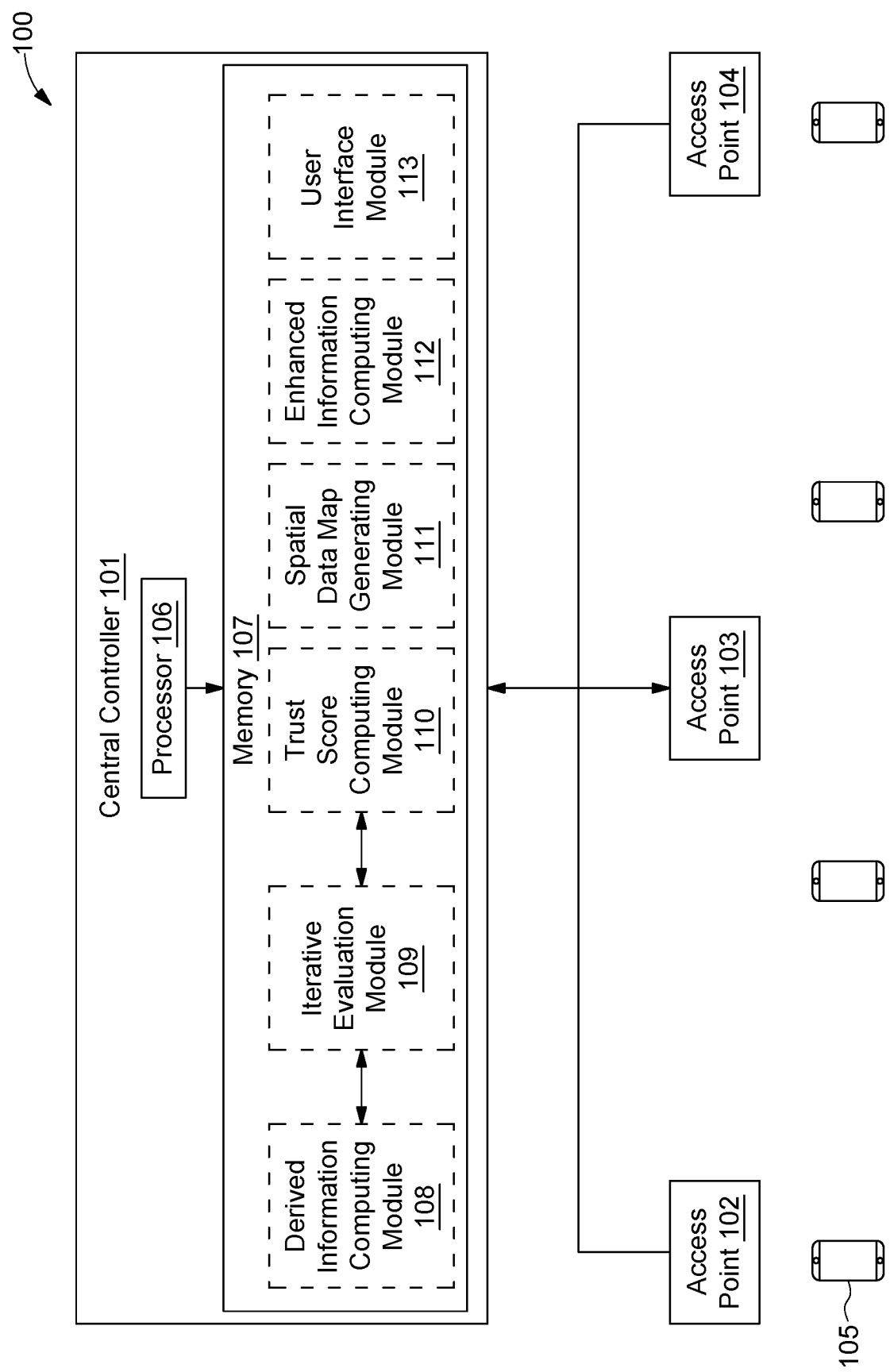
FIG. 1 illustrates a block diagram of an exemplary system for generating spatial data maps corresponding to a centralized wireless network, in accordance with some embodiments of the present disclosure.

Referring now to FIG. 1, an exemplary system 100 for generating spatial data maps corresponding to a centralized wireless network is illustrated, in accordance with some embodiments of the present disclosure. The system 100 includes a central controller 101 directly or indirectly communicably coupled to an access point 102, an access point 103, and an access point 104 through a lightweight communication protocol (for example, MQTT, CoAP, Lightweight Directory Access Protocol (LDAP), Lightweight Extensible Authentication Protocol (LEAP), Lightweight Presentation Protocol (LPP), Internet Content Adaptation Protocol (ICAP), Skinny Client Control Protocol (SCCP), OpenLDAP, etc.) in a star topology. Further, the system 100 includes a plurality of client devices (for example, a client device 105). By way of an example, the client device 105 may be a computing device (for example, a desktop, a laptop, a server, a notebook, a netbook, a tablet, a smartphone, a mobile phone, or the like) or any additional device providing network compatibility (for example, a dongle, a Li-Fi sleeve, or the like) to a computing device. Each of the plurality of client devices is configured to exchange data with one of the plurality of access points in the network. For example, the client device 105 exchanges data with the access point 102.

The central controller 101 receives network data from each of the plurality of access points and the plurality of client devices in real-time. Further, the central controller 101 computes and evaluates derived information and a trust score corresponding to the derived information based on the network data.

Each of the central controller 101 and the access points 102, 103, and 104 in the system 100 include one or more processors and a memory. For ease of explanation, only the central controller 101 is depicted as including a processor 106 and a memory 107. Additionally, the central controller 101 is implemented over a cloud server, in accordance with some embodiments of the present disclosure. Further, the memory 107 stores instructions that, when executed by the processor 106, cause the processor 106 to generate spatial data maps corresponding to the system 100 by computing derived information and a corresponding trust score based on network data received from each of the plurality of access points 102, 103, and 104. The memory 107 also stores various data (for example, a plurality of KPIs, raw information, the derived information, the corresponding trust score, enhanced information, geographical locations of the plurality of access points and the plurality of client devices, spatial data maps, and the like) that may be captured, processed, and/or required by the central controller 101.

The central processor 101 further includes, within the memory 107, a derived information computing module 108, an iterative evaluation module 109, a trust score computing module 110, a spatial data map generating module 111, an enhanced information computing module 112, a User Interface (UI) module 113.

In some embodiments, the central controller 101 installs one or more user space applications in the access point 102 through a lightweight communication protocol. The one or more user space applications are configured to establish a communication loop between the access point 102 and the central controller 101. Further, the access point 102 receives raw information from the client device 105. The access point 102 sends in real-time, network data through the one or more user space applications. It should be noted that the network data includes the raw information received from the client device 105 (wireless or wired operation) and a plurality of Key Performance Indicators (KPIs) of the access point 102 (wireless operation). It should be noted that collection of network data may involve definition of custom time basis for each of the collected network data. It may be noted that geographical position of the client device 105 is centrally available or calculated by the central controller 101 through positioning methods based on Relative Signal Strength Indicator (RSSI) or other indicators corresponding to the client device 105.

As will be appreciated by a person skilled in the art, explanation of functioning of the above mentioned modules use the access point 102 and the client device 105 as illustrative examples for simplicity of explanation and the said functioning can apply to any of the plurality of access points or the plurality of client devices in the system 100.

The derived information computing module 108 computes in a convenient time frame derived information based on the corresponding network data and a geographical location of each of the plurality of data sources (i.e., the plurality of access points and the plurality of client devices in the system 100). The derived information computing module 108 introduces centralized, scalable, and reliable computer service layers implementing computation steps of the derived information as a function of the spatial coordinates of network span of the system 100. The derived information computing module 108 implements a strategy for synchronizing centralized processing of the derived information. It should be noted that the strategy is varying depending upon a type of network considered. Further, the derived information computing module 108 selects a set of KPIs or raw indicators from the network data corresponding to a data source. Further, computation of the derived information includes correlating each of the selected set of KPIs or raw indicators with the geographical position of the data source. Further, the derived information computing module 108 elaborates a custom algorithm for centrally calculating the derived information leveraging on the network data collected from node and client operations.

Further, the spatial data map generating module 111 centrally elaborates a visual representation over a spatial distribution (hereafter, referred as map) of required span, granularity, and number of spatial dimensions (for examples, longitude and latitude, or longitude, latitude and altitude) for the derived information. It should be noted that the derived information corresponding to a data source is placed on the map, on the geographical location of the data source. The span of the map is assumed to be coincident with intended radio coverage area for one or more administered groups of network elements.

The iterative evaluation module 109 evaluates the derived information for each of the plurality of data points in network data span with missing information through a kriging interpolation technique at each of a plurality of iteration steps to obtain continuous derived information. In some embodiments, the iterative evaluation module 109 evaluates the derived information based on network data received from at least one data source positioned at a different geographical location at each of the plurality of iteration steps. In such embodiments, the iterative evaluation module 109 estimates missing information in the derived information in a next iteration step through the kriging interpolation technique based on the evaluated derived information to obtain the continuous derived information. It should be noted that the iterative evaluation module 109 acts in close synergy with the derived information computing module 108 and the trust score computing module 110. Additionally, the iterative evaluation module 109 orchestrates activities of each of these the derived information computing module 108 and the trust score computing module 110 at each iteration.

The iterative evaluation module 109 applies a kriging interpolation based on available spatial data to determine, with a desired granularity, the derived information for each of the plurality of data points on the map for which the derived information is not directly available. Further, the iterative evaluation module 109 selects a type of kriging and one or more models for variograms, based on peculiarities of the derived information required. Further, the iterative evaluation module 109 develops an iterative strategy, based on nature of the derived information, for re-evaluation of the derived information over time based on the network data received continuously by the central controller 101. Further, the iterative evaluation module 109 determines a strategy for the re-evaluation based on availability of raw information from new data sources located at different geographical locations, or from client devices that are able to move to different geographical locations, in order to collect network data from different space coordinates. Further, the iterative evaluation module 109 uses the collected network data for next kriging interpolation iterations. Additionally, the iterative evaluation module 109 uses the raw information from previous iteration steps in next iteration calculations. It should be noted that criteria for duration and quality of retention of the raw information from previous iteration steps is developed as a part of the re-evaluation strategy.

Further, the iterative evaluation module 109 leverages on new network data from previously unexplored data points in space to directly calculate the derived information corresponding to such data points. Further, the iterative evaluation module 109 leverages on both the new directly calculated derived information and the calculated derived information at previous iteration steps to continuously update map data in accordance with the iterative re-evaluation strategy developed.

For each of the plurality of data points with missing information in previous iterations, the trust score computing module 110 compares at each of the plurality of iteration steps, the derived information of current iteration step with the derived information at previous iteration steps to obtain a trust score corresponding to the continuous derived information.

The trust score computing module 110 defines a strategy to calculate, at an iteration step and alongside the updated map data, a distance (hereafter referred to as the trust score corresponding to the derived information), according to chosen metrics, between the derived information directly calculated from network data of a data point (for which the derived information was previously not available) and the derived information at previous iteration steps for the same data point (obtained through the kriging interpolation).

The spatial data map generating module 111 generates a spatial data map based on the geographical location of each of the plurality of data sources and at least one of the continuous derived information and the trust score corresponding to each of the plurality of data sources. The spatial data map generating module 111 prepares a map for the trust score (i.e., trust map), having the same span and the same granularity as the data map for the derived information. The spatial data map generating module 111 places the trust score corresponding to the derived information of each of the plurality of data sources available from direct calculation on the trust map.

Further, the iterative evaluation module 109 iteratively evaluates the trust score for each of the plurality of data points in the continuous derived information with missing information through a kriging interpolation technique at each of a plurality of iteration steps. The iterative evaluation module 109 further implements a strategy for iterative, continuous evaluation of the trust score corresponding to each of entire set of mapped derived information.

Further, the iterative evaluation module 109 evaluates trust map data for data points where directly calculated trust scores are not available using the kriging interpolation method. Further, the iterative evaluation module 109 selects specific type of kriging and models for variograms. Further, the iterative evaluation module 109 develops an iterative strategy for re-evaluation over time of the corresponding trust scores, based on the network data continuously collected by the central controller 101. It should be noted that the re-evaluation strategy for the corresponding trust scores is coherent with the derived information re-evaluation strategy in timing evolution of the plurality of iteration steps.

Further, the iterative evaluation module 109 determines a change in the trust score corresponding to the continuous derived information of each of the plurality of data sources at different time instances. Further, the iterative evaluation module 109 classifies the change in trust score into one of a set of variation categories through a classification algorithm. For example, the set of variation categories includes slow change, medium change, and fast change categories.

It should be noted that the determination and classification algorithms are dependent on nature and peculiarities of the derived information. The iterative evaluation module 109 further distinguishes between slow and fast variations of the trust score over time. The distinguishing is leveraged in order to support identification and classification of possible reasons for change in trust scores over time.

Further, the iterative evaluation module 109 generates one or more insights corresponding to the change in the trust score based on the continuous derived information through a predictive model to obtain enhanced information. The iterative evaluation module 109 enhances awareness over the derived information to obtain the enhanced information, by inferring valuable information out of identification and classification of trust scores over time. In some embodiments, the inference leverages on Artificial Intelligence (AI) or Machine Learning (ML) techniques or on different techniques for data interpolation, based on the nature and the peculiarities of the derived information.

At each of the plurality of iteration steps, the enhanced information computing module 112 determines a change in the trust score corresponding to the continuous derived information of each of the plurality of data sources. Further, the enhanced information computing module 112 classifies the change in trust score into one of a set of variation categories through a classification algorithm. Further, the enhanced information computing module 112 generates one or more insights corresponding to the change in the trust score based on the continuous derived information through a predictive model to obtain enhanced information.

Further, the iterative evaluation module 109 iteratively evaluates each of the continuous derived information, the corresponding trust score, and the corresponding enhanced information to obtain continuous derived information with an optimized trust score. This iterative evaluation module 109 elaborates a final and comprehensive strategy for a joint evaluation and iterative re-evaluation over time of the derived information, the corresponding trust score, and the enhanced information. The peculiarities of the targeted derived information drive a definition of the joint re-evaluation strategy. The joint re-evaluation strategy may explicitly foresee a visualization of the derived information coupled with the corresponding trust score and the enhanced information, that may be jointly represented over entirety of the map span.

Further, as a part of the joint re-evaluation strategy, the iterative evaluation module 109 leverages on the trust score and on the enhanced information of the derived information to provide a continuously refined and reliable derived information (where "reliable" implies a derived information with optimized trust score). It may be noted that the optimized trust score function is strictly dependent on the nature and peculiarities of the derived information. It may also be noted that the to obtain the optimized trust, specific algorithms and models (or alternately, usage of learning techniques) may be required.

Further, the spatial data map generating module 111 generates a combined spatial data map comprising each of the continuous derived information, the corresponding trust score, and the corresponding enhanced information.

The spatial data map generating module 111 structures visual representations of both the derived information and the corresponding trust score, as convenient and wherever possible, in form of heatmaps (i.e., maps where information is shown as color gradients associated with a value to be represented with the desired degree of precision and detail). This is further explained in conjunction with FIGS. 7A-D.

The UI module 113 renders the spatial data maps on a Graphical User Interface (GUI) via a display (not shown in figure) for a user. The system 100 also includes one or more external devices (not shown in figure). In some embodiments, the central controller 101 interacts with the one or more external devices over a communication network for sending or receiving various data. The external devices include, but may not be limited to, a remote server, a digital device, or another computing system.

It should be noted that all such aforementioned modules 108-113 may be represented as a single module or a combination of different modules. Further, as will be appreciated by those skilled in the art, each of the modules 108-113 may reside, in whole or in parts, on one device or multiple devices in communication with each other. In some embodiments, each of the modules 108-113 may be implemented as dedicated hardware circuit comprising custom application-specific integrated circuit (ASIC) or gate arrays, off-the-shelf semiconductors such as logic chips, transistors, or other discrete components. Each of the modules 108-113 may also be implemented in a programmable hardware device such as a field programmable gate array (FPGA), programmable array logic, programmable logic device, and so forth. Alternatively, each of the modules 108-113 may be implemented in software for execution by various types of processors (e.g., processor 106). An identified module of executable code may, for instance, include one or more physical or logical blocks of computer instructions, which may, for instance, be organized as an object, procedure, function, or other construct. Nevertheless, the executables of an identified module or component need not be physically located together, but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for generating spatial data maps corresponding to a centralized wireless network. For example, the exemplary system 100 and the associated central controller 101 may generate spatial data maps by the processes discussed herein. In particular, as will be appreciated by those of ordinary skill in the art, control logic and/or automated routines for performing the techniques and steps described herein may be implemented by the system 100 and the associated central controller 101 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 2:
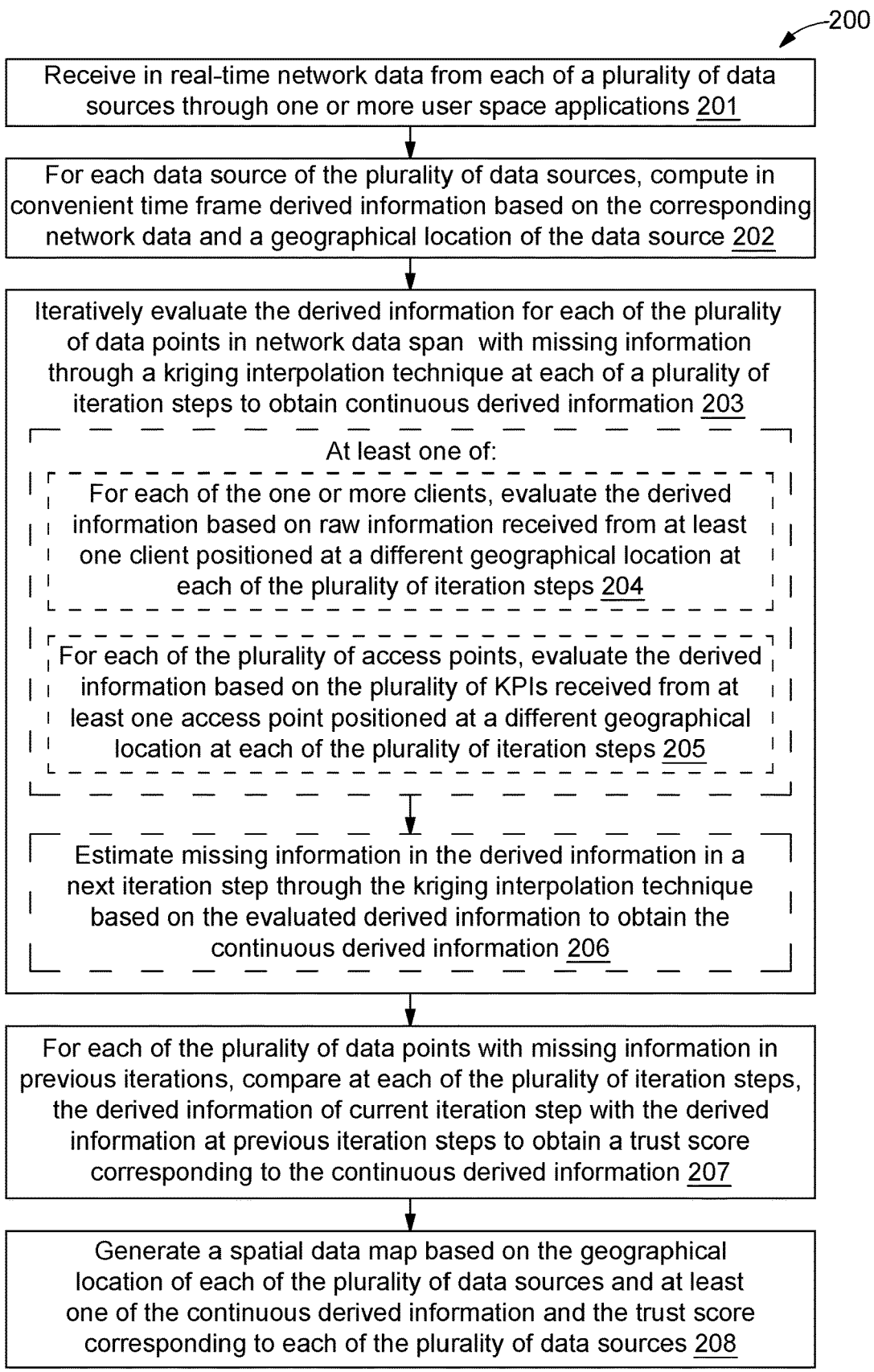
FIG. 2 illustrates a flow diagram of an exemplary control logic for generating spatial data maps corresponding to a centralized wireless network, in accordance with some embodiments of the present disclosure.

Referring now to FIG. 2, an exemplary control logic 200 for generating spatial data maps corresponding to a centralized wireless network is disclosed via a flowchart, in accordance with some embodiments of the present disclosure. In an embodiment, the control logic 200 is implemented by a system, such as the system 100 or the central controller 101. As illustrated in the flowchart, the control logic 200 includes receiving in real-time, by the central controller 101, network data from each of a plurality of data sources through one or more user space applications, at step 201. The network data includes a plurality of KPIs and raw information. The plurality of data sources includes a plurality of access points (for example, the access points 102, 103, and 104) and one or more clients (for example, the client device 105) associated with each of the plurality of access points. The one or more user space applications are configured to establish a communication loop between each of the plurality of access points and the central controller.

For each data source of the plurality of data sources, the control logic 200 further includes computing in a convenient time frame, including real-time, by the derived information computing module 108, derived information based on the corresponding network data and a geographical location of the data source, at step 202. The control logic 200 further includes iteratively evaluating, by the iterative evaluation module 109, the derived information for each of the plurality of data points in network data span with missing information through a kriging interpolation technique at each of a plurality of iteration steps to obtain continuous derived information, at step 203.

In some embodiments, to iteratively evaluate the derived information, for each of the one or more clients, the control logic 200 includes evaluating the derived information based on raw information received from at least one client positioned at a different geographical location at each of the plurality of iteration steps, at step 204. In some embodiments, to iteratively evaluate the derived information, for each of the plurality of access points, the control logic 200 includes evaluating the derived information based on the plurality of KPIs received from at least one access point positioned at a different geographical location at each of the plurality of iteration steps, at step 205. It should be noted that various embodiments of the control logic 200 may include at least one of the steps 204 and 205. In some embodiments, to iteratively evaluate the derived information, the control logic 200 includes estimating missing information in the derived information in a next iteration step through the kriging interpolation technique based on the evaluated derived information to obtain the continuous derived information, at step 206.

For each of the plurality of data points with missing information in previous iterations, the control logic 200 further includes comparing, by the trust score computing module 110, at each of the plurality of iteration steps, the derived information of current iteration step with the derived information at previous iteration steps to obtain a trust score corresponding to the continuous derived information, at step 207. In some embodiments, the control logic 200 includes iteratively evaluating the trust score for each of the plurality of data points in the continuous derived information with missing information through a kriging interpolation technique at each of a plurality of iteration steps.

The control logic 200 further includes generating, by the spatial data map generating module 111, a spatial data map based on the geographical location of each of the plurality of data sources and at least one of the continuous derived information and the trust score corresponding to each of the plurality of data sources, at step 208.

Figure 3:
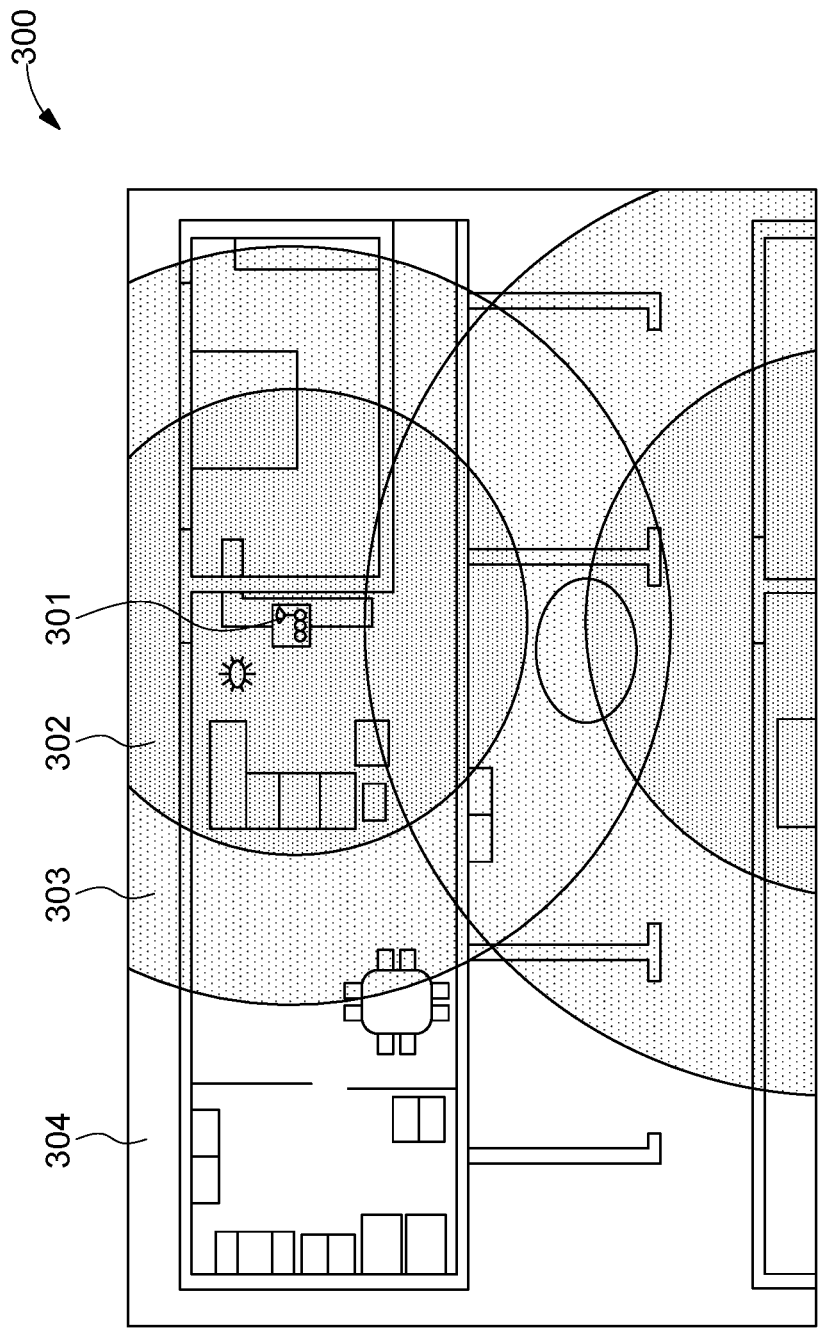
FIG. 3 is an exemplary spatial data map representing various coverage areas corresponding to an access point in a network, in accordance with an embodiment of the present disclosure.

Referring now to FIG. 3, an exemplary spatial data map 300 representing various coverage areas corresponding to an access point (for example, the access point 102) in a network is illustrated, in accordance with an embodiment of the present disclosure. The spatial data map 300 includes an access point representation 301. By way of an example, the access point representation 301 corresponds to the access point 102. Further, the spatial data map 300 represents a strong coverage area 302, an intermediate coverage area 303, and a weak coverage area 303 corresponding to the access point representation 301.

By way of an example, the various coverage areas may be indicative of Wi-Fi radio coverage calculated based on radio propagation models from hotspots (such as, access points) based on associated RSSIs. In an embodiment, the spatial data map 300 helps in detecting various coverage areas in a network and identifying coverage holes in the network.

Figure 4B:
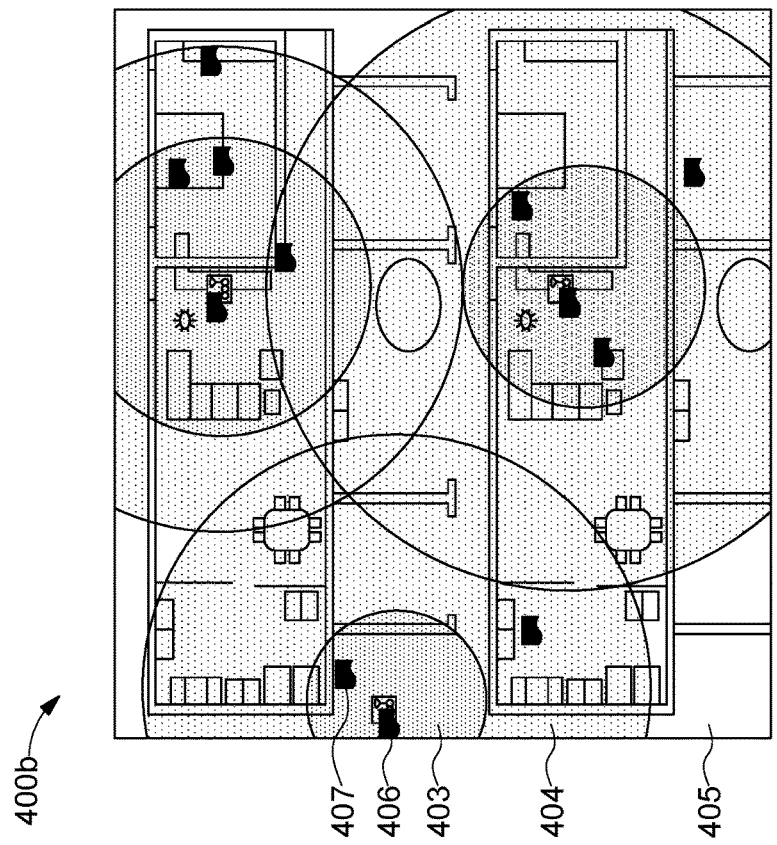
FIGS. 4A-C are exemplary spatial data maps representing various coverage areas and data sources in a network at different time instances, in accordance with an embodiment of the present disclosure.
Figure 4A:
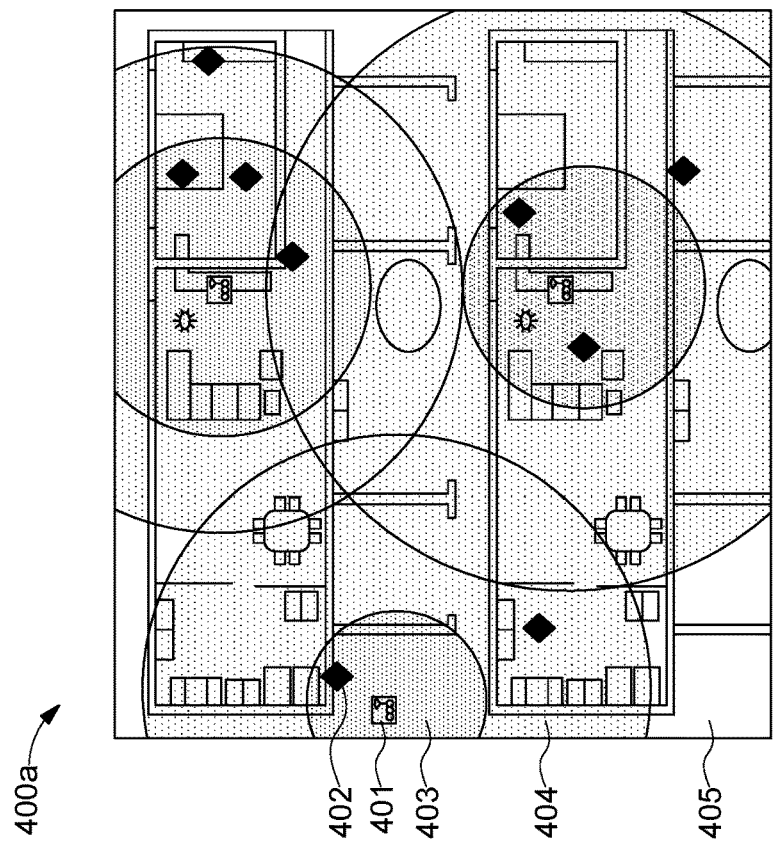
Figure 4C:
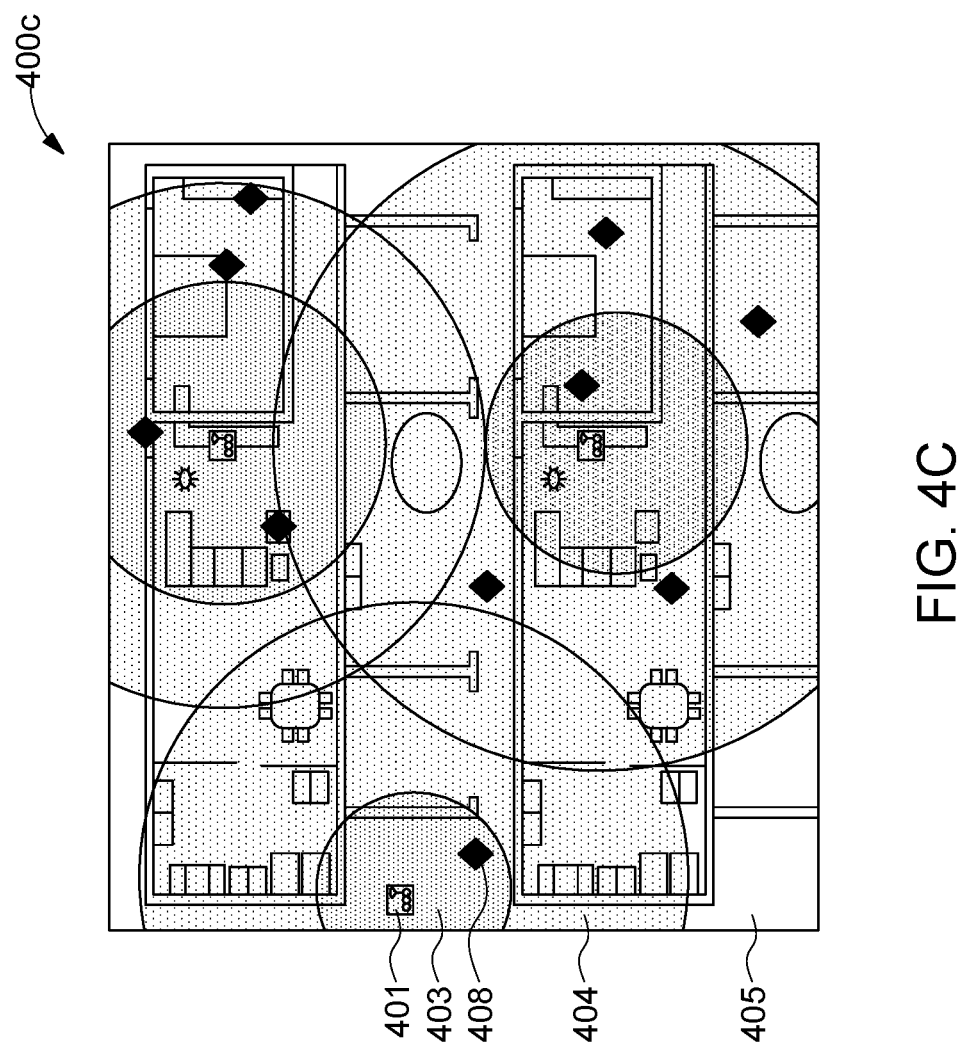

Referring now to FIGS. 4A-C, exemplary spatial data maps representing various coverage areas and data sources in a network (for example, the network 100) at different time instances are illustrated, in accordance with an embodiment of the present disclosure. In FIG. 4A, a spatial data map 400a represents a plurality of access points and a plurality of client devices in the network. For example, the spatial data map 400a includes an access point representation 401 and a client device representation 402. Further, the spatial data map 400a represents a strong coverage area 403, an intermediate coverage area 404, and a weak coverage area 405 corresponding to the access point representation 401.

In FIG. 4B, a spatial data map 400b represents the plurality of data sources represented in the spatial data map 400a for which network data is available. The spatial data map 400b represents each of the plurality of access points and the plurality of client devices in the network as a data source. For example, a data source representation 406 corresponds to the access point representation 401 and a data source representation 407 corresponds to the client device representation 402.

In FIG. 4C, a spatial data map 400c represents the plurality of access points and the plurality of client devices in the network similar to the spatial data map 400a but at a different time instance. For example, the spatial data map 400a represents the plurality of access points and the plurality of client devices in the network at a time instance 'k'. Then, the spatial data map 400c represents the plurality of access points and the plurality of client devices in the network at a time instance 'k+1'. The spatial data map 400c represents a client device representation 408, which is a representation of the same client device that corresponds to the client device representation 402 in the spatial data map 400a.

The spatial data maps 400a, 400b, and 400c allow a visualization of change in the derived information for each of the plurality of data sources with time.

Figure 5:
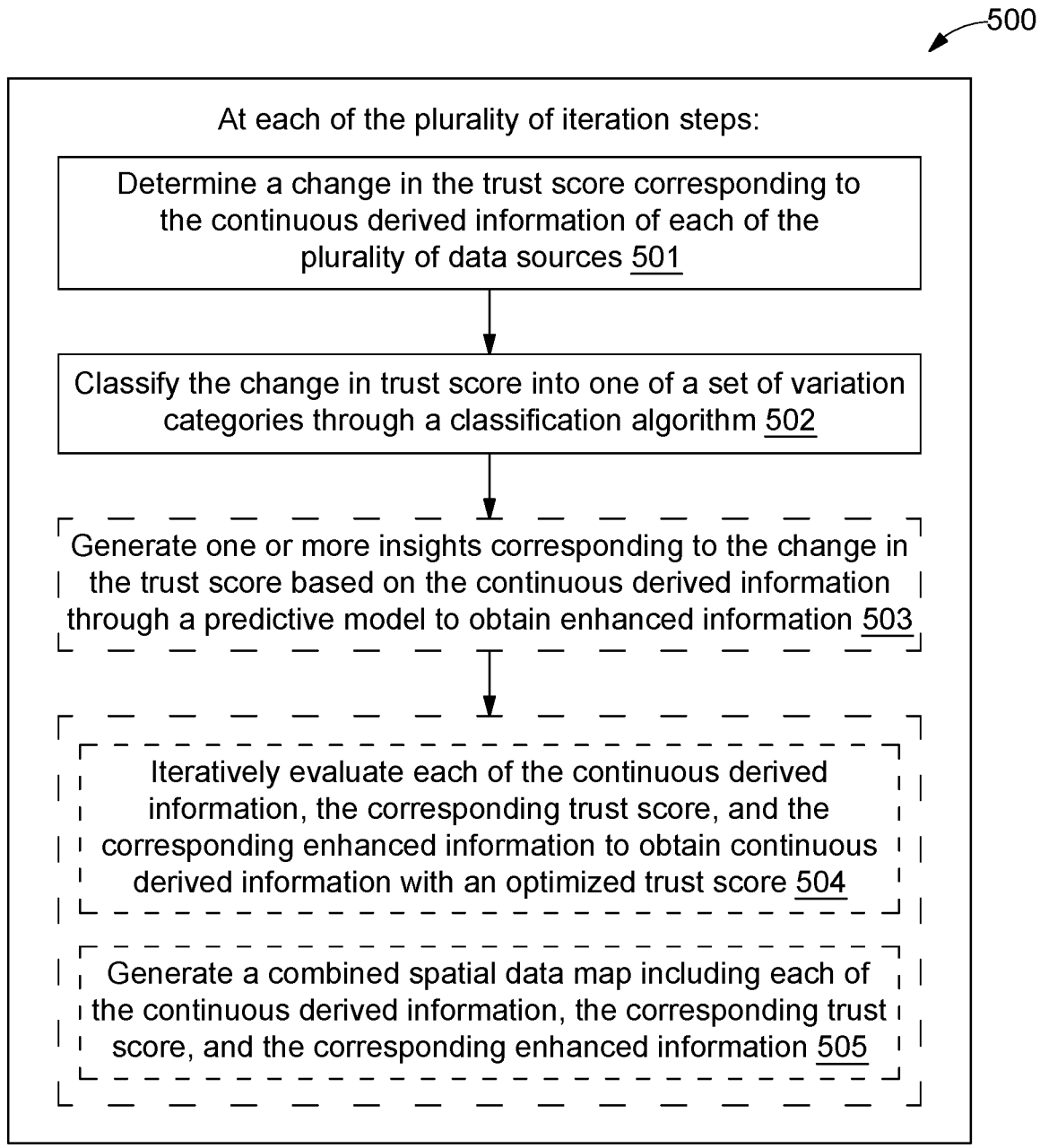
FIG. 5 illustrates a flow diagram of an exemplary control logic for generating a combined spatial data map including each of the continuous derived information, the corresponding trust score, and the corresponding enhanced information, in accordance with some embodiments of the present disclosure.

Referring now to FIG. 5, an exemplary control logic for generating a combined spatial data map including each of the continuous derived information, the corresponding trust score, and the corresponding enhanced information is depicted via a flowchart, in accordance with some embodiments of the present disclosure. In an embodiment, the control logic 500 is implemented by a system, such as the system 100 or the central controller 101. It should be noted that the control logic 500 is performed at each of a plurality of iteration steps. As illustrated in the flowchart, the control logic 500 includes determining, by the enhanced information computing module 112, a change in the trust score corresponding to the continuous derived information of each of the plurality of data sources, at step 501.

The control logic 500 further includes classifying, by the enhanced information computing module 112, the change in trust score into one of a set of variation categories through a classification algorithm, at step 502. In some embodiments, the control logic 500 further includes generating, by the enhanced information computing module 112, one or more insights corresponding to the change in the trust score based on the continuous derived information through a predictive model to obtain enhanced information, at step 503.

In some embodiments, the control logic 500 further includes iteratively evaluating, by the iterative evaluation module 109, each of the continuous derived information, the corresponding trust score, and the corresponding enhanced information to obtain continuous derived information with an optimized trust score, at step 504. In some embodiments, the control logic 500 further includes generating, by the spatial data map generating module 111, a combined spatial data map comprising each of the continuous derived information, the corresponding trust score, and the corresponding enhanced information, at step 505. It should be noted that various embodiments of the control logic 500 may include at least one of the steps 504 and 505.

Referring now to FIGS. 6A-D, exemplary spatial data maps representing various information levels associated with a network are illustrated, in accordance with an embodiment of the present disclosure.

Figure 6A:
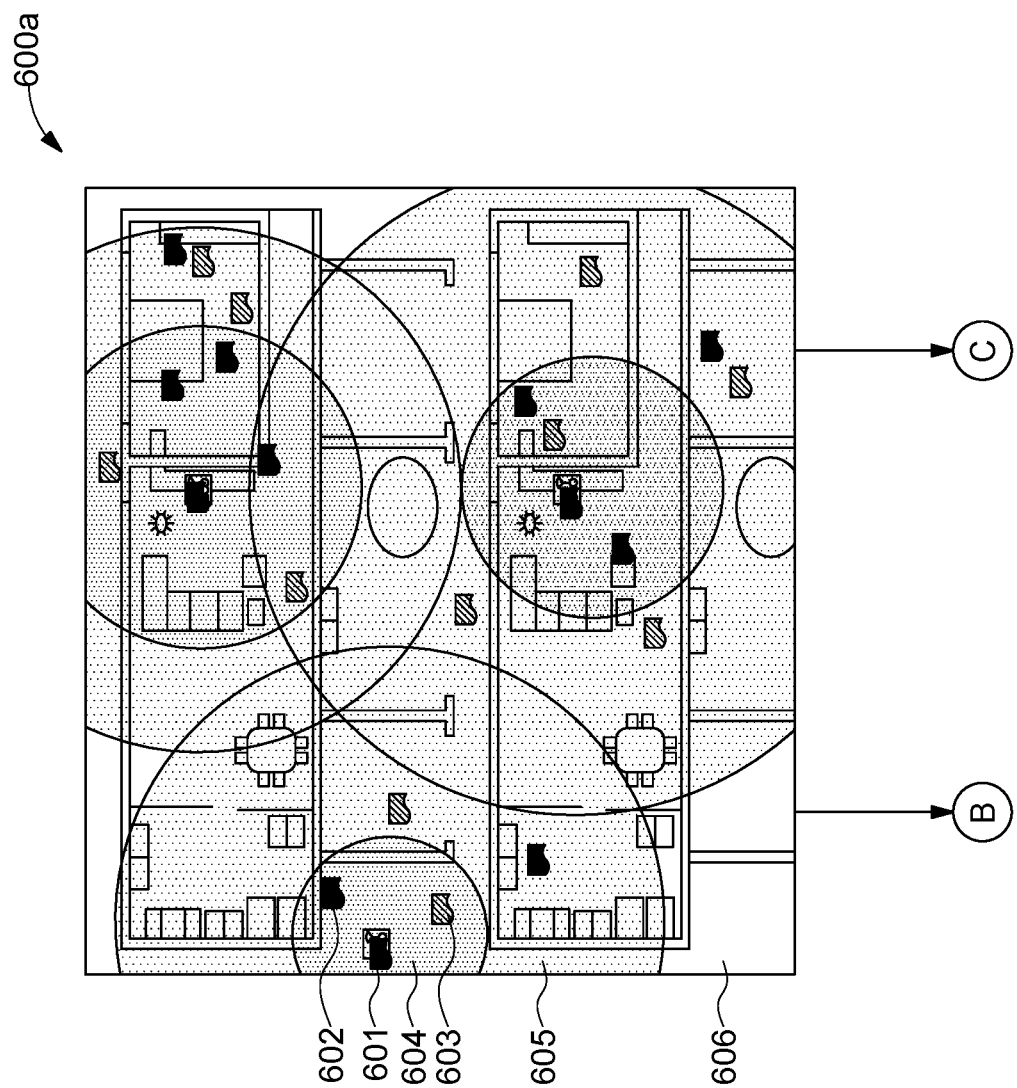
FIGS. 6A-D are exemplary spatial data maps representing various information levels associated with a network, in accordance with an embodiment of the present disclosure.

In FIG. 6A, a spatial data map 600a is a superimposition of data maps of the network at time instances 'k' and 'k+1'. The spatial data map 600a includes an access point representation 601, a client device representation 602 at time instance 'k', and a client device representation 603 at time instance 'k+1'. At each of the time instances 'k' and 'k+1', the access point representation 601 stays at same position since an access point corresponding to the access point representation 601 is stationary. It may be noted that in some embodiments, access point representations may correspond to mobile access points. However, a client device corresponding to the client device representation is mobile and geographical location of the client device changes between the time instances 'k' and 'k+1'.

Figure 6C:
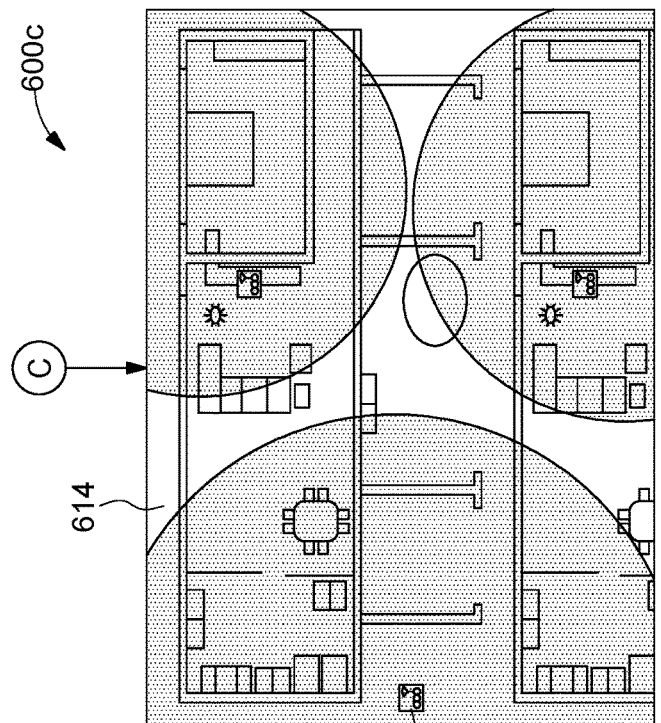
Figure 6B:
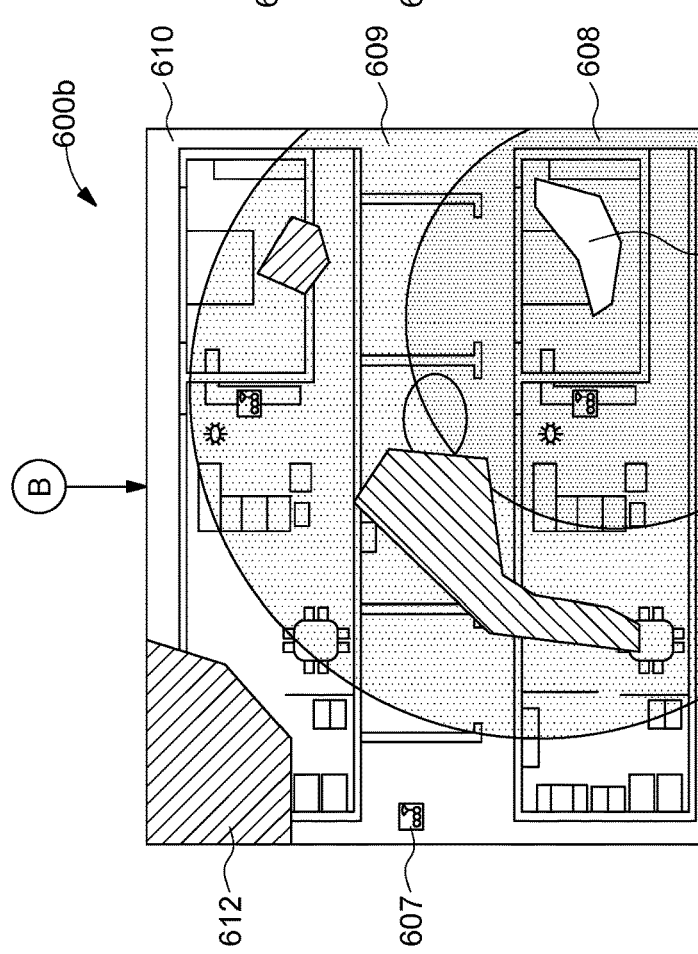

In FIG. 6B, a spatial data map 600b is the trust map representing trust trend levels and changes in trust scores of the network between the time instances 'k' and 'k+1'. The spatial data map 600b includes access point representations (such as, an access point representation 607), regions corresponding to trust trend levels (for example, a region 608 corresponds to a strong trust trend level, a region 609 corresponds to an intermediate trust trend level, and a region 610 corresponds to a weak trust trend level). The spatial data map 600b further includes trust area 611 indicating fast variations in trust scores between the time instances 'k' and 'k+1' and trust area 612 indicating slow variations in trust scores between the time instances 'k' and 'k+1'.

In FIG. 6C, a spatial data map 600c represents information distribution levels corresponding to the network between the time instances 'k' and 'k+1'. The spatial data map 600c includes a strong information distribution level 613 and a weak information distribution level 614.

Figure 6D:
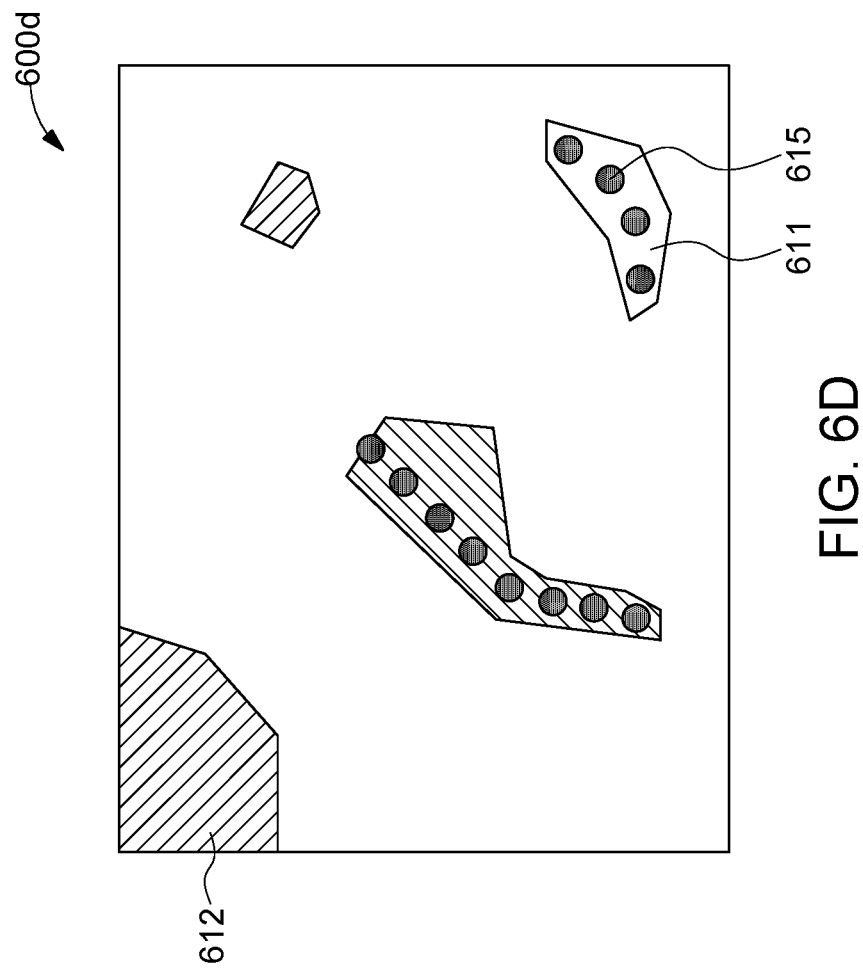

In FIG. 6D, a spatial data map 600d represents enhanced information between the time instances 'k' and 'k+1'. The spatial data map 600d is obtained based on the spatial data map 600b (i.e., trust map) and the spatial data map 600c (i.e., information map). The spatial data map 600d provides one or more insights based on the change in trust scores and information levels. For example, the spatial data map 600d helps in identifying a signal propagation obstacle 615 in an interference region corresponding to the high variation trust area 611.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 7:
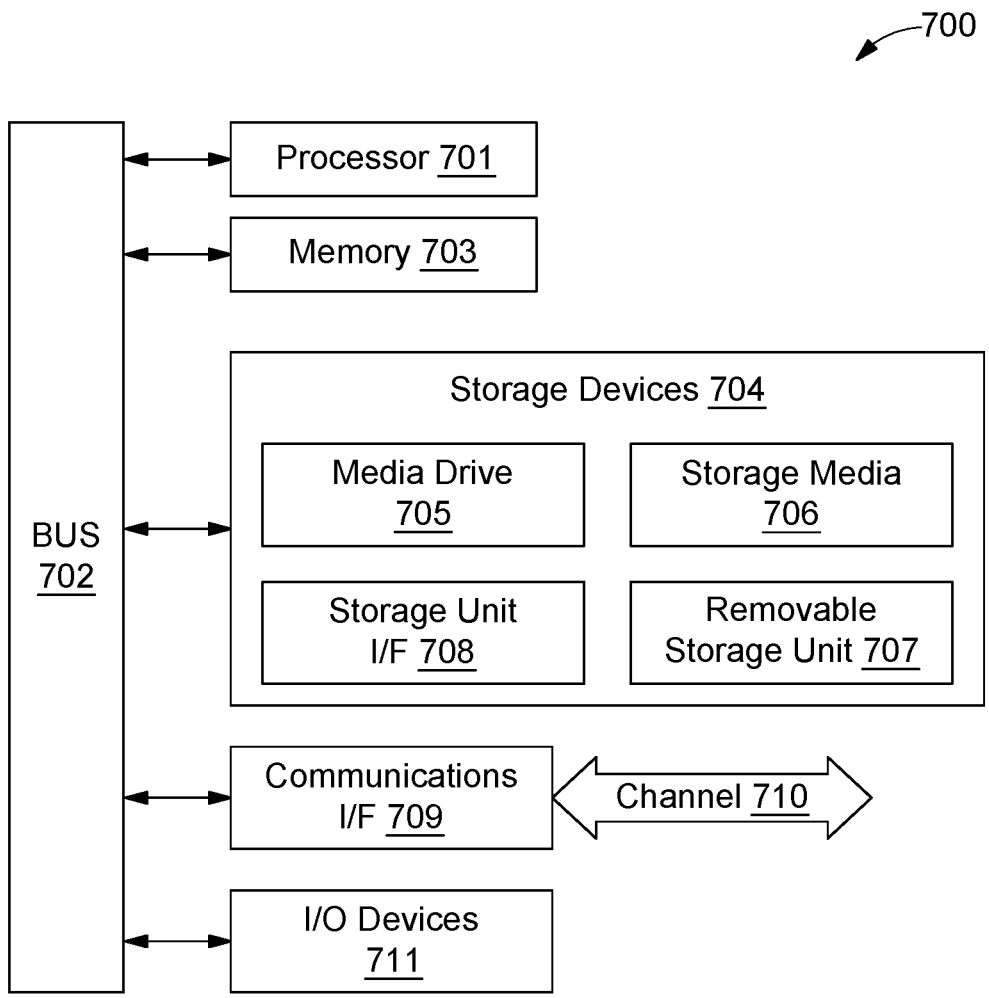
FIG. 7 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 7, an exemplary computing system 700 that may be employed to implement processing functionality for various embodiments (e.g., as a SIMD device, client device, server device, one or more processors, or the like) is illustrated. Those skilled in the relevant art will also recognize how to implement the invention using other computer systems or architectures. The computing system 700 may represent, for example, a user device such as a desktop, a laptop, a mobile phone, personal entertainment device, DVR, and so on, or any other type of special or general-purpose computing device as may be desirable or appropriate for a given application or environment. The computing system 700 may include one or more processors, such as a processor 701 that may be implemented using a general or special purpose processing engine such as, for example, a microprocessor, microcontroller or other control logic. In this example, the processor 701 is connected to a bus 702 or other communication medium. In some embodiments, the processor 701 may be an Artificial Intelligence (AI) processor, which may be implemented as a Tensor Processing Unit (TPU), or a graphical processor unit, or a custom programmable solution Field-Programmable Gate Array (FPGA).

The computing system 700 may also include a memory 703 (main memory), for example, Random Access Memory (RAM) or other dynamic memory, for storing information and instructions to be executed by the processor 701. The memory 703 also may be used for storing temporary variables or other intermediate information during execution of instructions to be executed by the processor 701. The computing system 700 may likewise include a read only memory ("ROM") or other static storage device coupled to bus 702 for storing static information and instructions for the processor 701.

The computing system 700 may also include a storage device 704, which may include, for example, a media drives 705 and a removable storage interface. The media drive 705 may include a drive or other mechanism to support fixed or removable storage media, such as a hard disk drive, a floppy disk drive, a magnetic tape drive, an SD card port, a USB port, a micro USB, an optical disk drive, a CD or DVD drive (R or RW), or other removable or fixed media drive. A storage media 706 may include, for example, a hard disk, magnetic tape, flash drive, or other fixed or removable medium that is read by and written to by the media drive 705. As these examples illustrate, the storage media 706 may include a computer-readable storage medium having stored there in particular computer software or data.

In alternative embodiments, the storage devices 704 may include other similar instrumentalities for allowing computer programs or other instructions or data to be loaded into the computing system 700. Such instrumentalities may include, for example, a removable storage unit 707 and a storage unit interface 708, such as a program cartridge and cartridge interface, a removable memory (for example, a flash memory or other removable memory module) and memory slot, and other removable storage units and interfaces that allow software and data to be transferred from the removable storage unit 707 to the computing system 700.

The computing system 700 may also include a communications interface 709. The communications interface 709 may be used to allow software and data to be transferred between the computing system 700 and external devices. Examples of the communications interface 709 may include a network interface (such as an Ethernet or other NIC card), a communications port (such as for example, a USB port, a micro USB port), Near field Communication (NFC), etc. Software and data transferred via the communications interface 709 are in the form of signals which may be electronic, electromagnetic, optical, or other signals capable of being received by the communications interface 709. These signals are provided to the communications interface 709 via a channel 710. The channel 710 may carry signals and may be implemented using a wireless medium, wire or cable, fiber optics, or other communications medium. Some examples of the channel 710 may include a phone line, a cellular phone link, an RF link, a Bluetooth link, a network interface, a local or wide area network, and other communications channels.

The computing system 700 may further include Input/Output (I/O) devices 711. Examples may include, but are not limited to a display, keypad, microphone, audio speakers, vibrating motor, LED lights, etc. The I/O devices 711 may receive input from a user and also display an output of the computation performed by the processor 701. In this document, the terms "computer program product" and "computer-readable medium" may be used generally to refer to media such as, for example, the memory 703, the storage devices 704, the removable storage unit 707, or signal(s) on the channel 710. These and other forms of computer-readable media may be involved in providing one or more sequences of one or more instructions to the processor 701 for execution. Such instructions, generally referred to as "computer program code" (which may be grouped in the form of computer programs or other groupings), when executed, enable the computing system 700 to perform features or functions of embodiments of the present invention.

In an embodiment where the elements are implemented using software, the software may be stored in a computer-readable medium and loaded into the computing system 700 using, for example, the removable storage unit 707, the media drive 705 or the communications interface 709. The control logic (in this example, software instructions or computer program code), when executed by the processor 701, causes the processor 701 to perform the functions of the invention as described herein.

Thus, the disclosed method and system try to overcome the technical problem of generating spatial data maps corresponding to a centralized wireless network. The method and system address a need for extending knowledge beyond mere measurements available from few sensors through application of spatial interpolation for information and trust scores. Computed extended knowledge is represented with a scalable spatial granularity. Further, the method and system provide a smart strategy for repeating measurements on different points at different times while performing interpolation, enforced by a synchronous assessment over the trust of the ongoing interpolation results in an efficient, reliable and spatially scalable method for calculating and presenting each desired information satisfying the prerequisite. Further, the method and system are relatively simple in concept and implementation.

As will be appreciated by those skilled in the art, the techniques described in the various embodiments discussed above are not routine, or conventional, or well understood in the art.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for generating spatial data maps corresponding to a centralized wireless network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for generating spatial data maps corresponding to a centralized wireless network, the method comprising:
   receiving in real-time, by a central controller in the wireless network, network data from each of a plurality of data sources through one or more user space applications, wherein the network data comprises a plurality of Key Performance Indicators (KPIs) and raw information, wherein the plurality of data sources comprises a plurality of access points and one or more clients associated with each of the plurality of access points, and wherein the one or more user space applications are configured to establish a communication loop between each of the plurality of access points and the central controller;
   for each data source of the plurality of data sources, computing in a convenient time frame, by the central controller, derived information based on the corresponding network data and a geographical location of the data source;
   iteratively evaluating, by the central controller, the derived information for each of the plurality of data points in network data span with missing information through a kriging interpolation technique at each of a plurality of iteration steps to obtain continuous derived information;
   for each of the plurality of data points with missing information in previous iterations, comparing, by the central controller, at each of the plurality of iteration steps, the derived information of current iteration step with the derived information at previous iteration steps to obtain a trust score corresponding to the continuous derived information; and
   generating, by the central controller, a spatial data map based on the geographical location of each of the plurality of data sources and at least one of the continuous derived information and the trust score corresponding to each of the plurality of data sources.

2. The method of claim 1, further comprising iteratively evaluating the trust score for each of the plurality of data points in the continuous derived information with missing information through a kriging interpolation technique at each of a plurality of iteration steps.

3. The method of claim 1, further comprising, at each of the plurality of iteration steps:
   determining a change in the trust score corresponding to the continuous derived information of each of the plurality of data sources; and
   classifying the change in trust score into one of a set of variation categories through a classification algorithm.

4. The method of claim 3, further comprising generating one or more insights corresponding to the change in the trust score based on the continuous derived information through a predictive model to obtain enhanced information.

5. The method of claim 4, further comprising iteratively evaluating each of the continuous derived information, the corresponding trust score, and the corresponding enhanced information to obtain continuous derived information with an optimized trust score.

6. The method of claim 4, further comprising generating a combined spatial data map comprising each of the continuous derived information, the corresponding trust score, and the corresponding enhanced information.

7. The method of claim 1, wherein iteratively evaluating, by the central controller, the derived information comprises:
   at least one of,
      for each of the one or more clients, evaluating the derived information based on raw information received from at least one client positioned at a different geographical location at each of the plurality of iteration steps; and
      for each of the plurality of access points, evaluating the derived information based on the plurality of KPIs received from at least one access point positioned at a different geographical location at each of the plurality of iteration steps; and
   estimating missing information in the derived information in a next iteration step through the kriging interpolation technique based on the evaluated derived information to obtain the continuous derived information.

8. A system for generating spatial data maps corresponding to a centralized wireless network, the system comprising:
   a processor; and
   a memory communicatively coupled to the processor, wherein the memory stores processor instructions, which when executed by the processor, cause the processor to:
      receive in real-time, network data from each of a plurality of data sources through one or more user space applications, wherein the network data comprises a plurality of Key Performance Indicators (KPIs) and raw information, wherein the plurality of data sources comprises a plurality of access points and one or more clients associated with each of the plurality of access points, and wherein the one or more user space applications are configured to establish a communication loop between each of the plurality of access points and the central controller;
      for each data source of the plurality of data sources, compute in a convenient time frame, derived information based on the corresponding network data and a geographical location of the data source;
      iteratively evaluate the derived information for each of the plurality of data points in network data span with missing information through a kriging interpolation technique at each of a plurality of iteration steps to obtain continuous derived information;

for each of the plurality of data points with missing information in previous iterations, compare at each of the plurality of iteration steps, the derived information of current iteration step with the derived information at previous iteration steps to obtain a trust score corresponding to the continuous derived information; and generate a spatial data map based on the geographical location of each of the plurality of data sources and at least one of the continuous derived information and the trust score corresponding to each of the plurality of data sources.

9. The system of claim 8, wherein the processor-executable instructions further cause the processor to iteratively evaluate the trust score for each of the plurality of data points in the continuous derived information with missing information through a kriging interpolation technique at each of a plurality of iteration steps.

10. The system of claim 8, wherein the processor-executable instructions further cause the processor to, at each of the plurality of iteration steps:

determine a change in the trust score corresponding to the continuous derived information of each of the plurality of data sources; and classify the change in trust score into one of a set of variation categories through a classification algorithm.

11. The system of claim 10, wherein the processor-executable instructions further cause the processor to generate one or more insights corresponding to the change in the trust score based on the continuous derived information through a predictive model to obtain enhanced information.

12. The system of claim 11, wherein the processor-executable instructions further cause the processor to iteratively evaluate each of the continuous derived information, the corresponding trust score, and the corresponding enhanced information to obtain continuous derived information with an optimized trust score.

13. The system of claim 11, wherein the processor-executable instructions further cause the processor to generate a combined spatial data map comprising each of the continuous derived information, the corresponding trust score, and the corresponding enhanced information.

14. The system of claim 8, wherein to iteratively evaluate the derived information, the processor-executable instructions cause the processor to:

at least one of, for each of the one or more clients, evaluate the derived information based on raw information received from at least one client positioned at a different geographical location at each of the plurality of iteration steps; and for each of the plurality of access points, evaluate the derived information based on the plurality of KPIs received from at least one access point positioned at a different geographical location at each of the plurality of iteration steps; and estimate missing information in the derived information in a next iteration step through the kriging interpolation technique based on the evaluated derived information to obtain the continuous derived information.

15. A non-transitory computer-readable medium storing computer-executable instructions for generating spatial data maps corresponding to a centralized wireless network, the computer-executable instructions configured for:

receiving in real-time, network data from each of a plurality of data sources through one or more user space applications, wherein the network data comprises a plurality of Key Performance Indicators (KPIs) and raw information, wherein the plurality of data sources comprises a plurality of access points and one or more clients associated with each of the plurality of access points, and wherein the one or more user space applications are configured to establish a communication loop between each of the plurality of access points and the central controller;

for each data source of the plurality of data sources, computing in a convenient time frame, derived information based on the corresponding network data and a geographical location of the data source;

iteratively evaluating the derived information for each of the plurality of data points in network data span with missing information through a kriging interpolation technique at each of a plurality of iteration steps to obtain continuous derived information;

for each of the plurality of data points with missing information in previous iterations, comparing at each of the plurality of iteration steps, the derived information of current iteration step with the derived information at previous iteration steps to obtain a trust score corresponding to the continuous derived information; and generating a spatial data map based on the geographical location of each of the plurality of data sources and at least one of the continuous derived information and the trust score corresponding to each of the plurality of data sources.

16. The non-transitory computer-readable medium of claim 15, wherein the computer-executable instructions are further configured for iteratively evaluating the trust score for each of the plurality of data points in the continuous derived information with missing information through a kriging interpolation technique at each of a plurality of iteration steps.

17. The non-transitory computer-readable medium of claim 15, wherein the computer-executable instructions are further configured for, at each of the plurality of iteration steps:

determining a change in the trust score corresponding to the continuous derived information of each of the plurality of data sources; and classifying the change in trust score into one of a set of variation categories through a classification algorithm.

18. The non-transitory computer-readable medium of claim 17, wherein the computer-executable instructions are further configured for generating one or more insights corresponding to the change in the trust score based on the continuous derived information through a predictive model to obtain enhanced information.

19. The non-transitory computer-readable medium of claim 18, wherein the computer-executable instructions are further configured for generating a combined spatial data map comprising each of the continuous derived information, the corresponding trust score, and the corresponding enhanced information.

20. The non-transitory computer-readable medium of claim 15, wherein to iteratively evaluate the derived information, the computer-executable instructions are configured for:

at least one of, for each of the one or more clients, evaluating the derived information based on raw information received from at least one client positioned at a different geographical location at each of the plurality of iteration steps; and for each of the plurality of access points, evaluating the derived information based on the plurality of KPIs received from at least one access point positioned at a different geographical location at each of the plurality of iteration steps; and estimating missing information in the derived information in a next iteration step through the kriging interpolation technique based on the evaluated derived information to obtain the continuous derived information.

\* \* \* \* \*